Sept. 1, 1959 G. M. DAVIS 2,902,217

CONTROL GATING MEANS FOR A DIGITAL COMPUTER

Filed Feb. 1, 1954 3 Sheets-Sheet 1

GEORGE MORBEY DAVIS
*Inventor*

By Stevens, Davis, Miller & Mosher
*Attorney*

CONTROL GATING MEANS FOR A DIGITAL COMPUTER

Filed Feb. 1, 1954 3 Sheets-Sheet 2

Inventor
GEORGE MORBEY DAVIS
By Stevens, Davis, Miller & Mosher
Attorneys

GEORGE MORBEY DAVIS
*Inventor*
By Stevens, Davis, Miller & Mosher
*Attorneys*

2,902,217

CONTROL GATING MEANS FOR A DIGITAL COMPUTER

George Morbey Davis, Golders Green, London, England, assignor to National Research Development Corporation, London, England, a corporation of Great Britain Application February 1, 1954, Serial No. 407,195

Claims priority, application Great Britain February 11, 1953

4 Claims. (Cl. 235—152)

This invention relates to electrical digital computing engines.

The terminology and notation used in this specification is well known to those skilled in the art and has been defined and explained in the specification accompanying co-pending U.S. application Serial No. 202,615, now Patent No. 2,686,632, issued August 17, 1954.

It is usual in these engines to transfer stored words from one part of the engine to another part thereof via a common conducting path, often called "highway."

The output and input gates of the stores of the engine will be connected to highway and will be opened to effect a transfer by source and destination address signals in the instruction word ordering the transfer. It is also necessary in these engines occasionally to activate other gates which are not connected to highway. For example it is usual to include an instruction which activates a buzzer or other signal to indicate that a computation is finished or which starts an output mechanism.

Reference will be made to the accompanying drawings in which.

Figure 1:
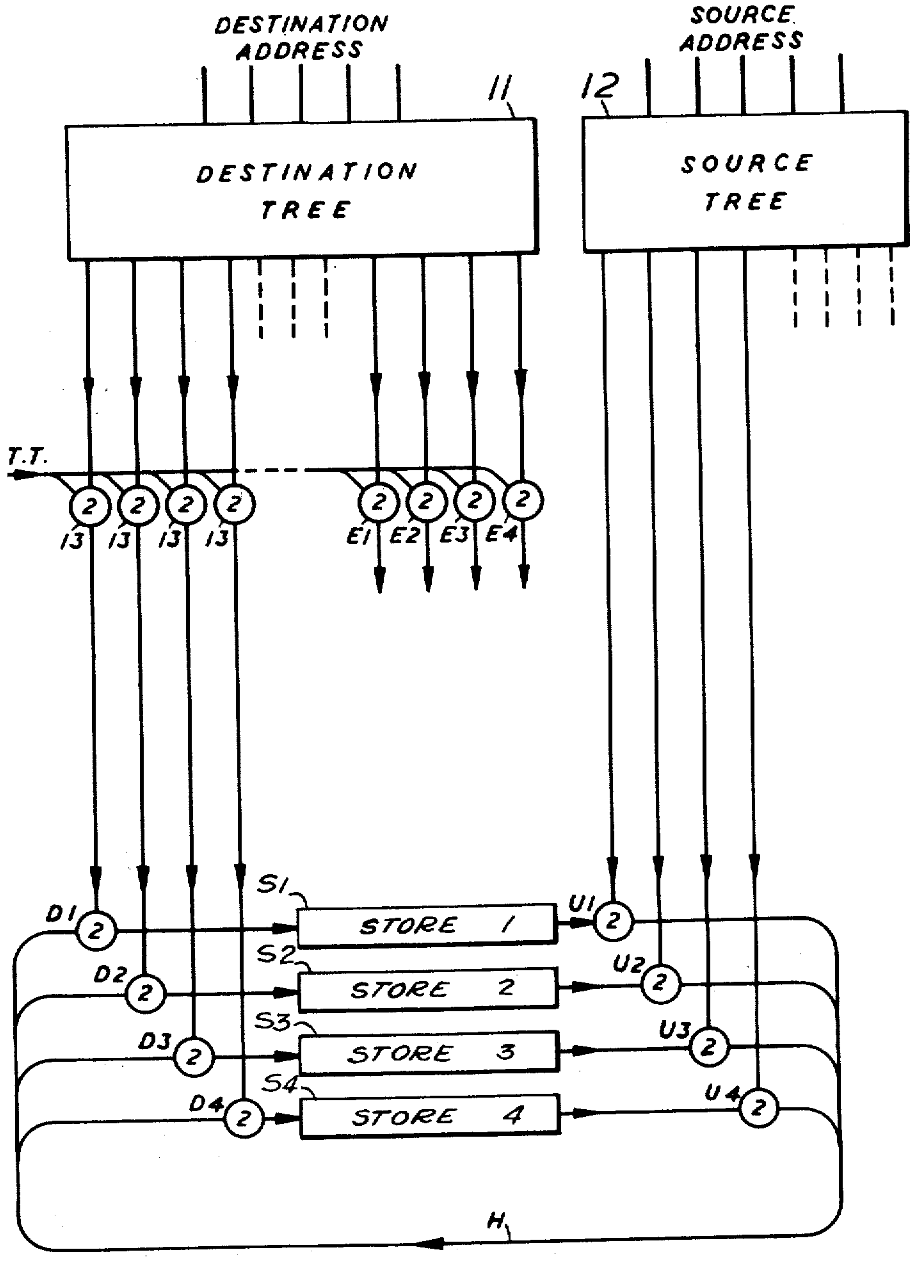
Fig. 1 shows the prior art.

One arrangement that has hitherto been used is shown in Figure 1 of the accompanying drawings.

In this case the stores or arithmetical organs such as adders, multipliers or the like (of which four are shown at S1, S2, S3 and S4) are connected to highway H via distination gates (D1, D2, D3 and D4) and source gates (U1, U2, U3 and U4). The destination and source gates are respectively conditioned by the separate outputs from destination and source trees 11 and 12 which are set up by the staticised destination and source addresses in well known manner. The actual timing of the transfer may be controlled by gates such as 13 conditioned by a suitable timing pulse TT in known manner.

In addition to the destinations (such as D1, D2, D3 and D4), connected in highway the destination tree 11 may also activate other gates, of which four are shown at E1, E2, E3 and E4. These gates also may be controlled by the timing pulse TT.

Only one destination gate is opened at any given time; it follows, therefore, that if the destination gate open at any time is one of those gates that are not connected to highway then it is immaterial which source gate is open because the information flowing from it to highway meets only closed destination gates. (Those skilled in this art will understand that information flowing from a store is also retained in the store and information is erased only when new information is coming in via a destination gate.)

The present invention takes advantage of this fact and according to the invention there is provided an electrical digital computing engine having destination and source gates connected to a common conduction path, a destination tree circuit for conditioning the said destination gates, a source tree circuit for conditioning the said source gates, and a further plurality of gates not connected to the said common path and conditioned collectively by an output line of the said destination tree circuit and separately by separate output lines from the said source tree circuit which also condition some of the said source gates.

Figure 2:
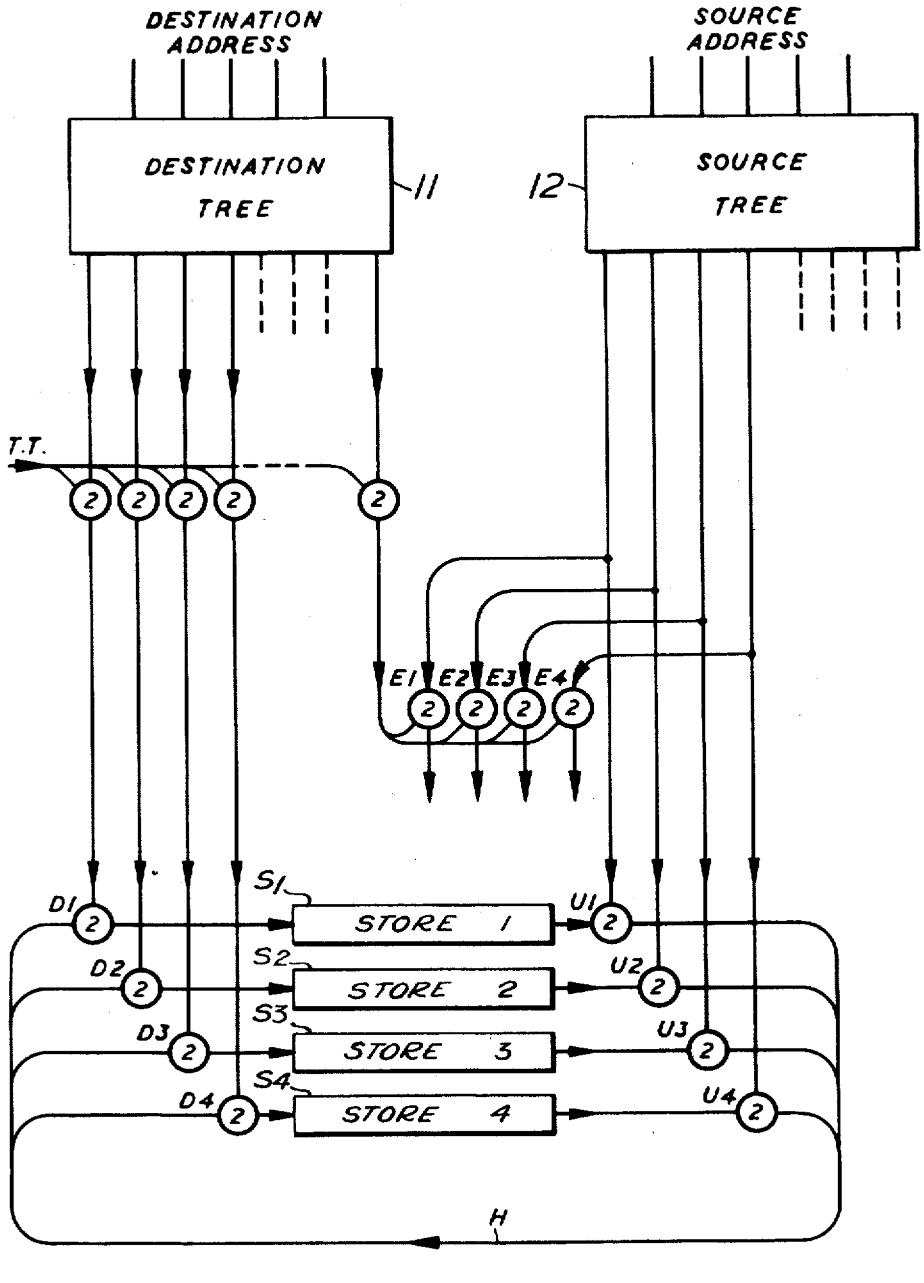
Fig. 2 shows an embodiment of the present invention.

An embodiment of the invention is shown in Figure 2 of the drawings. Parts of this figure are similar to parts of Figure 1 and such parts are similarly numbered.

In this case the gates (such as E1, E2, E3 and E4) not connected to highway H are all conditioned by a single output lead from the destination tree 11 and are separately conditioned by separate output leads from the source tree 12. These leads also condition source gates (such as U1, U2, U3 and U4) connected to highway but, as explained above, this is immaterial. The single output from the destination tree 11 may be controlled by the timing pulse TT as shown.

The merit of this arrangement over the prior art will be apparent to those skilled in these matters. For example the number of destinations will be limited by the number of digits in the instruction word that can be spared for destination address numbers, now in the prior art shown in Figure 1, four destination addresses are used for the extra gates E1, E2, E3 and E4 whereas in the new arrangement shown in Figure 2 only one destination address is used for the four extra gates and the necessary extra discrimination is obtained from the source address number. In this example three more destination addresses become available and may be used to extend the storage capacity of the engine or for other purposes.

Figure 3:
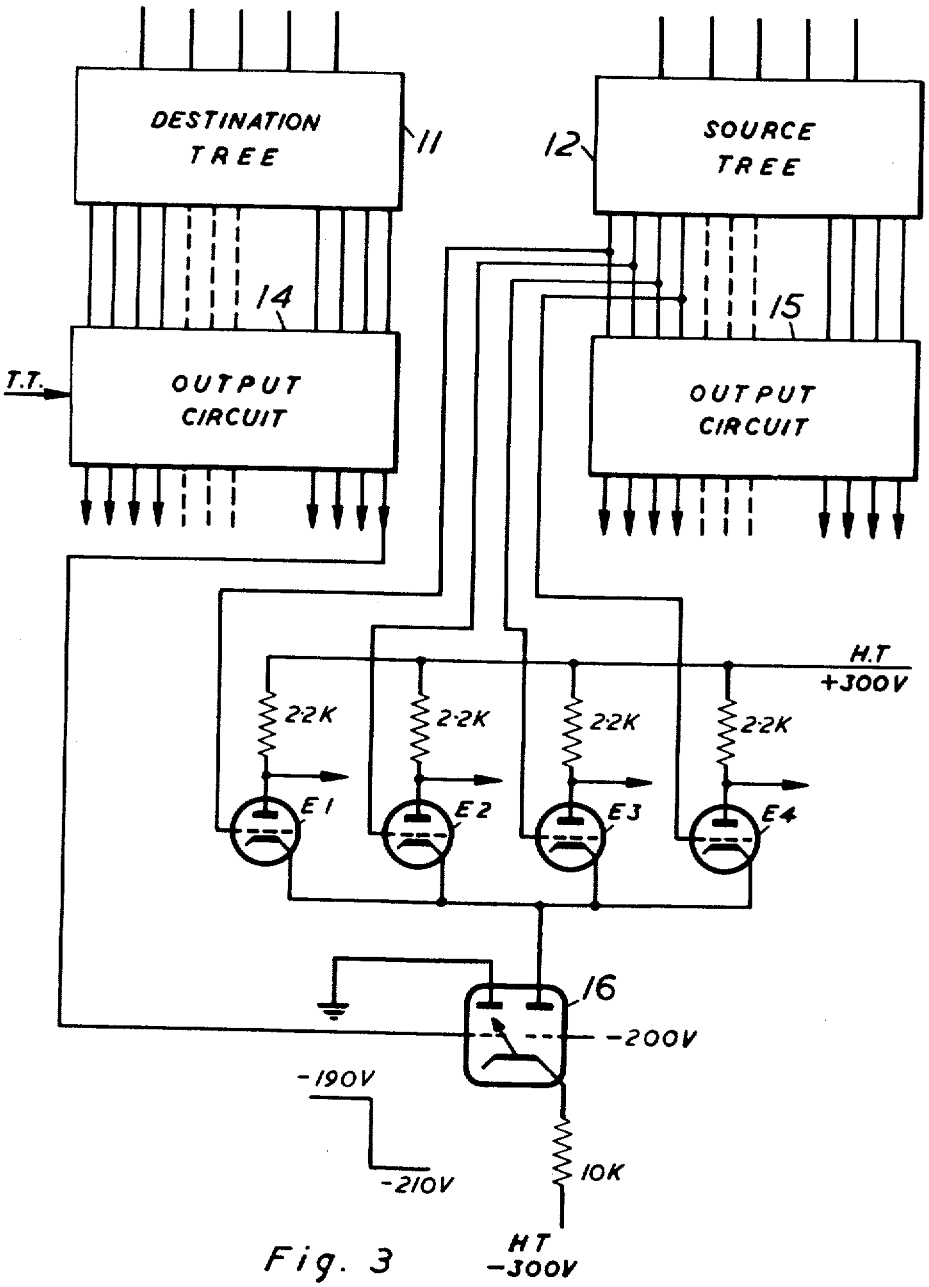
Fig. 3 shows details of a circuit according to the invention.

The invention may very conveniently be carried out using the tree output circuit described in the specification of U.S. Patent No. 2,645,714. Such an embodiment is shown in Figure 3 of the drawings. In this figure the destination and source trees feed output circuits 14 and 15 respectively. These output circuits may conveniently be of the kind described in the said co-pending application, that is to say they may each comprise a plurality of valves having separate input circuits controlled separately by the output lines from the tree and separate anode circuits but a common cathode load. The gate valves E1—E4 form a similar output circuit in which the grids are controlled by the selected output leads of the source tree 12 and the common cathode load is the double triode valve 16 which normally conducts on its left-hand grid but which conducts on its right-hand grid when the one selected line from the destination tree output circuit 14 is energised to reduce the potential of the left-hand grid. Possible components values and operating voltages are indicated in the picture.

Thus the one gate valve of E1—E4 selected by the source tree gives the required output when the selected output on the destination tree is energised.

In one engine which utilised the present invention the destinations lying outside highway which were energised by the method described above were:

(1) Multiply.
(2) Divide.
(3) Call output.
(4) Call input.
(5) Sound buzzer.
(6) Stop buzzer.
(7) Clear output indicators.
(8) Prepare for double length arithmetic.
(9) Prepare for single length arithmetic.

This machine has a multiple/divide circuit to which the operands are initially sent and the signal "multiply" or "divide" starts the operation. It will be clear that destinations (1) and (2) in this list form an alternative pair similarly (5) and (6), and (8) and (9) are alternative pairs.

Other possible destinations will occur to those skilled in the art and it is an advantage of the invention that extra destinations lying outside highway that would previously be rejected as costly luxuries may now be used without encroaching on the storage destinations.

In all ordinary uses of the invention only one gate (such as 16 in Fig. 3) will condition the plurality of gates (such as E1, E2, E3 and E4) outside highway, because the number of such gates may be as high as the number of source addresses. But in special cases (e.g. when the number of source addresses is less than the number of gates required outside highway) more than one gate conditioned by the destination tree may condition the gates outside highway.

The tree circuits may, of course, be any known kind e.g. resistance or diode matrices or Christmas-tree circuits.

I claim:

1. An electrical digital computing engine having a common conducting path, destination and source gates connected to the said common conducting path, a destination tree circuit connected to the said destination gates, a separate source tree circuit connected to the said source gates, and a further plurality of gates for controlling the engine and separate from the said common conducting path, all the said separate further plurality of gates being connected collectively to an output line of the said destination tree circuit and each of the said separate further plurality of gates being connected separately to a separate output line from the said source tree circuit which also conditions some of the said source gates.

2. An electrical digital computing engine comprising a plurality of source gates and a first plurality of destination gates, a common conducting path interconnecting the said plurality of source gates and first plurality of destination gates, a second plurality of destination gates for controlling the engine and separate from the said common conducting path, a destination tree circuit connected to the destination gates in the said first plurality of destination gates separately and the destination gates in the said second plurality of destination gates collectively and a separate source tree circuit connected to the source gates in the said plurality of source gates separately and to the destination gates in the said second plurality of destination gates separately but in such a way that at least one connection from the said source tree circuit is connected to both a destination gate in the said second plurality of destination gates and a source gate in the said plurality of source gates.

3. An electrical digital computing engine comprising a plurality of source gates and a first plurality of destination gates, a common conducting path interconnecting the said source gates and the said first plurality of destination gates, a source tree circuit connected to the said source gates and a separate destination tree circuit connected to the said first plurality of destination gates, a second plurality of destination gates for controlling the engine and separate from the said common conducting path and taking the form of a plurality of electronic valves each having at least a cathode, a grid and an anode, and connected to have separate grid and anode circuits but a common cathode circuit, an electronic gate valve circuit connected to the said common cathode circuit for controlling the passage of current in the said plurality of electronic valves, a connection between the electronic gate valve circuit and the said destination tree circuit and separate connections between the said separate grid circuits and the output leads of the said source tree circuit for controlling the current in the said separate anode circuits, the arrangement being such that at least one of the said output leads is also connected to one of the said source gates.

4. An electrical digital computing engine including a destination tree circuit, means for setting up the said destination tree circuit, destination gates connected to separate outputs of the said destination tree circuit, a source tree circuit, means for setting up the said source tree circuit, source gates connected to separate outputs of the said source tree circuit, a common conducting path, the outputs of all the source gates being applied to all the destination gates via the said common conducting path and further gates for controlling the engine and separate from the said common conducting path and connected collectively to an output line of the said destination tree circuit and separately to separate output lines of the said source tree circuit which are also connected to at least some of the said source gates.

References Cited in the file of this patent

UNITED STATES PATENTS

| | | |
|---|---|---|
| 2,556,200 | Lesti | June 12, 1951 |
| 2,674,733 | Robbins | Apr. 6, 1954 |
| 2,686,299 | Eckert | Aug. 10, 1954 |
| 2,700,504 | Thomas | Jan. 25, 1955 |
| 2,733,861 | Rajchman | Feb. 7, 1956 |

OTHER REFERENCES

Auerback: "The Binac," Proc. of IRE, January 1952, pages 12–28.